US012646979B2

(12) United States Patent
Perigo et al.

(10) Patent No.: US 12,646,979 B2
(45) Date of Patent: Jun. 2, 2026

(54) NON-EXCHANGED-COUPLE INJECTION MOLDABLE HYBRID MAGNET

(71) Applicant: ABB Schweiz AG, Baden (CH)

(72) Inventors: Elio Alberto Perigo, Wendell, NC (US); Darren D. Tremelling, Apex, NC (US); Sheng Zhong, Hillsborough, NC (US)

(73) Assignee: ABB Schweiz AG, Baden (CH)

( * ) Notice: Subject to any disclaimer, the term of this patent is extended or adjusted under 35 U.S.C. 154(b) by 273 days.

(21) Appl. No.: 18/307,418

(22) Filed: Apr. 26, 2023

(65) Prior Publication Data

US 2024/0364148 A1 Oct. 31, 2024

(51) Int. Cl.
| | |
|---|---|
| *H02K 1/02* | (2006.01) |
| *H01F 1/059* | (2006.01) |
| *H01F 1/08* | (2006.01) |
| *H01F 41/02* | (2006.01) |
| *H02K 1/22* | (2006.01) |
| *H02K 15/03* | (2025.01) |
| *H02K 1/276* | (2022.01) |

(52) U.S. Cl.
CPC ............... *H02K 1/02* (2013.01); *H01F 1/059* (2013.01); *H01F 1/083* (2013.01); *H01F 41/0266* (2013.01); *H02K 1/22* (2013.01); *H01F 41/0246* (2013.01); *H02K 1/276* (2013.01); *H02K 15/03* (2013.01)

(58) Field of Classification Search
CPC ...... H01F 1/059; H01F 1/083; H01F 41/0246; H02K 1/02
See application file for complete search history.

(56) References Cited

U.S. PATENT DOCUMENTS

| | | | |
|---|---|---|---|
| 2013/0187311 A1* | 7/2013 | Yoshima | B29C 48/92 |
| | | | 264/429 |
| 2013/0241340 A1* | 9/2013 | Koga | H02K 1/2773 |
| | | | 310/156.56 |

(Continued)

FOREIGN PATENT DOCUMENTS

| | | | |
|---|---|---|---|
| CN | 111378282 A | 7/2020 | |
| JP | H09134519 A * | 5/1997 | ............... G11B 5/70 |

(Continued)

OTHER PUBLICATIONS

Yang et al., "Magnetic properties of the anisotropic MnBi/Sm2Fe17Nx hybrid magnet," *J. of Applied Physics*, 115, 17A721 (2014).

(Continued)

*Primary Examiner* — Oluseye Iwarere
*Assistant Examiner* — Daniel K Schlak
(74) *Attorney, Agent, or Firm* — Fitch Even Tabin & Flannery LLP

(57) ABSTRACT

A rotor for an electric machine is disclosed, the rotor including a plurality of cavities filled with a magnetic material. In the disclosed rotor, the magnetic material includes Samarium-Iron-Nitrogen (Sm—Fe—N) particles, Manganese-Bismuth (Mn—Bi) particles, and a polymer binder. Performance characteristics of the magnetic material, such as following the rule of mixtures and exhibiting a linear relationship based on volume fraction of the Mn—Bi particles, are also disclosed.

9 Claims, 4 Drawing Sheets

(56) References Cited

U.S. PATENT DOCUMENTS

| | | | | |
|---|---|---|---|---|
| 2016/0168660 A1* | 6/2016 | Kim | H01F 1/0557 |
| | | | 252/62.55 |
| 2016/0322134 A1* | 11/2016 | Kim | B22F 9/04 |
| 2018/0183285 A1* | 6/2018 | Asano | H02K 21/14 |
| 2019/0229260 A1* | 7/2019 | Wang | H10N 50/80 |
| 2021/0323070 A1* | 10/2021 | Nlebedim | B22F 10/34 |
| 2023/0246496 A1* | 8/2023 | Yoshida | H02K 1/2773 |
| | | | 310/156.56 |
| 2024/0221987 A1* | 7/2024 | Harada | H01F 13/003 |
| 2024/0275242 A1* | 8/2024 | Nakayama | H02K 1/2773 |
| 2024/0333053 A1* | 10/2024 | Yoshimoto | H02K 1/27 |
| 2024/0347241 A1* | 10/2024 | Choi | H01F 1/08 |
| 2024/0364190 A1* | 10/2024 | Zhong | H02K 1/27 |
| 2024/0388151 A1* | 11/2024 | Tsuge | H02K 1/28 |
| 2025/0023398 A1* | 1/2025 | Tremelling | H02K 15/03 |

FOREIGN PATENT DOCUMENTS

| | | | | | |
|---|---|---|---|---|---|
| JP | 2001167963 A | * | 6/2001 | | H01F 1/059 |
| JP | 2008-255436 A | | 10/2008 | | |
| JP | 2014192980 A | * | 10/2014 | | H02K 15/03 |
| JP | 2015-204638 A | | 11/2015 | | |
| JP | 2018170451 A | * | 11/2018 | | H01F 1/09 |
| JP | 2018170452 A | * | 11/2018 | | H01F 1/08 |
| JP | 7591214 B1 | * | 11/2024 | | H02K 1/276 |
| WO | WO-2013103118 A1 | * | 7/2013 | | H02K 1/2766 |

OTHER PUBLICATIONS

Zhang et al., "Magnetic properties and thermal stability of MnBi/SmFeN hybrid bonded magnets," *J. of Applied Physics*, 115, 17A746 (2014).

The Rare Earth Observer, "China Quota Gap explained; REE KPIs for Investment; Xinjiang Lithium; Malaysia IAC Deposits; Indonesia focus on RE; Lynas record result potential; Uganda: Ionic cause landgrab; Endgame strategies;" article downloaded from the Internet on Jun. 14, 2022, at https://treo.substack.com/p/china-quota-gap-explained-ree-kpis?s=r, 15 pp. (Jun. 8, 2022).

European Patent Office, Extended European Search Report in European Patent Application No. 24172387.3, 11 pp. (Oct. 21, 2024).

* cited by examiner

100

102

106

104

-PRIOR ART-

NON-EXCHANGED-COUPLE INJECTION MOLDABLE HYBRID MAGNET

FIELD

The present disclosure relates to an injection moldable hybrid composite magnet.

BACKGROUND OF THE INVENTION

Conventional reluctance motors include rotors with a soft magnetic material. The rotors include a plurality of laminations stacked together. Once stacked, cavities formed within the individual laminations and within the resultant rotor are filled manually with magnets, such as sintered magnets. Because the shape of the cavities in the rotor must be repeated with sufficiently controlled tolerances across a plurality of laminations and because of the complex shape of each lamination, synchronous reluctance rotors can be expensive to produce. These costs are further increased by the need for complex magnet shapes, the need for the magnets to have tightly controlled tolerances that are compatible with the lamination tolerances, and the manufacturing complexities associated with aligning and inserting magnets during a manufacturing process.

Available injection moldable hybrid magnets are typically made of mixtures of rare earth compounds and ferrites. Although functional, such hybrid magnets require an increase in the concentration of Neodymium-Iron-Boron (Nd—Fe—B) in order to meet high intrinsic coercivity requirements, thus increasing cost at a rate that outpaces coercivity improvements.

Accordingly, there is a need for alternative hybrid composite magnets that provide improved performance characteristics while reducing cost of materials and production.

BRIEF SUMMARY OF THE INVENTION

A rotor for an electric machine, comprising a plurality of cavities filled with a magnetic material, wherein the magnetic material includes Samarium-Iron-Nitrogen (Sm—Fe—N) particles, Manganese-Bismuth (Mn—Bi) particles, and a polymer binder.

BRIEF DESCRIPTION OF THE SEVERAL VIEWS OF THE DRAWINGS

Subject matter of the present disclosure will be described in even greater detail below based on the exemplary figures. All features described and/or illustrated herein can be used alone or combined in different combinations. The features and advantages of various implementations will become apparent by reading the following detailed description with reference to the attached drawings, which illustrate the following.

DETAILED DESCRIPTION OF THE INVENTION

Aspects of the present disclosure include magnetic compounds that bring a unique combination of properties for low-voltage, large alternating current, and traction motors.

In an embodiment, a magnetic compound that may be used for filling magnetic material into a reluctance motor's rotor includes Samarium-Iron-Nitrogen (Sm—Fe—N), and Manganese-Bismuth (Mn—Bi) via technologies, such as injection, transfer, compression molding, as well as potting. Although Sm—Fe—N is commercially available as a magnetic compound, Mn—Bi is not generally commercially available. As used herein, "Mn—Bi" refers to a magnetic compound that does not include iron. From a molding standpoint, the combination of Sm—Fe—N and Mn—Bi is expected to be as flexible as other hybrid magnets in terms of its compatibility with a variety of thermoplastic materials such as nylon, polycarbonate, polyethylene, polyvinyl chloride, acrylonitrile-acrylate-styrene (ABS), and polypropylene. Moreover, the combination of Sm—Fe—N and Mn—Bi can be achieved based on processing features (such as particle sizes, particle size distribution, and volume fractions) that enable simple linear relationships in terms of magnetic performance. The linear relationships thus enable accurate prediction of magnetic performance and accommodate designing to a particular magnetic performance range.

The current landscape of known injection moldable magnetic materials can be generally separated into three categories: ferrite-based, hybrids, and rare-earth-based. The rare-earth-based magnetic materials typically include Neodymium-Iron-Boron (Nd—Fe—B). Relatively speaking, ferrite-based materials generally have a low coercivity and low magnetic strength. In comparison, rare-earth-based magnetic materials generally have a high coercivity and high magnetic strength. Although higher coercivity and higher magnetic strength are often preferable for use in many applications, the cost difference often outpaces the performance difference when transitioning from a ferrite-based to rare-earth-based magnetic material. In some instances, the cost of a rare-earth material can be as much as fifteen times the cost of a ferrite-based material. Thus, compromises in magnetic strength and coercivity are desirable to reduce extraordinarily high costs. Hybrids bridge the gap between ferrite-based and rare-earth-based magnetic materials, offering a compromise between the two in terms of coercivity and magnetic strength, but reducing cost. As a result, hybrids offer an ideal magnetic material in applications where better performance than ferrite-based magnets is required or preferred, but expensive rare-earth-based materials can be avoided. As used herein, the term "hybrid" in the context of magnetic materials refers to a mixture of at least two magnetic compounds with a polymer.

Figure 1:
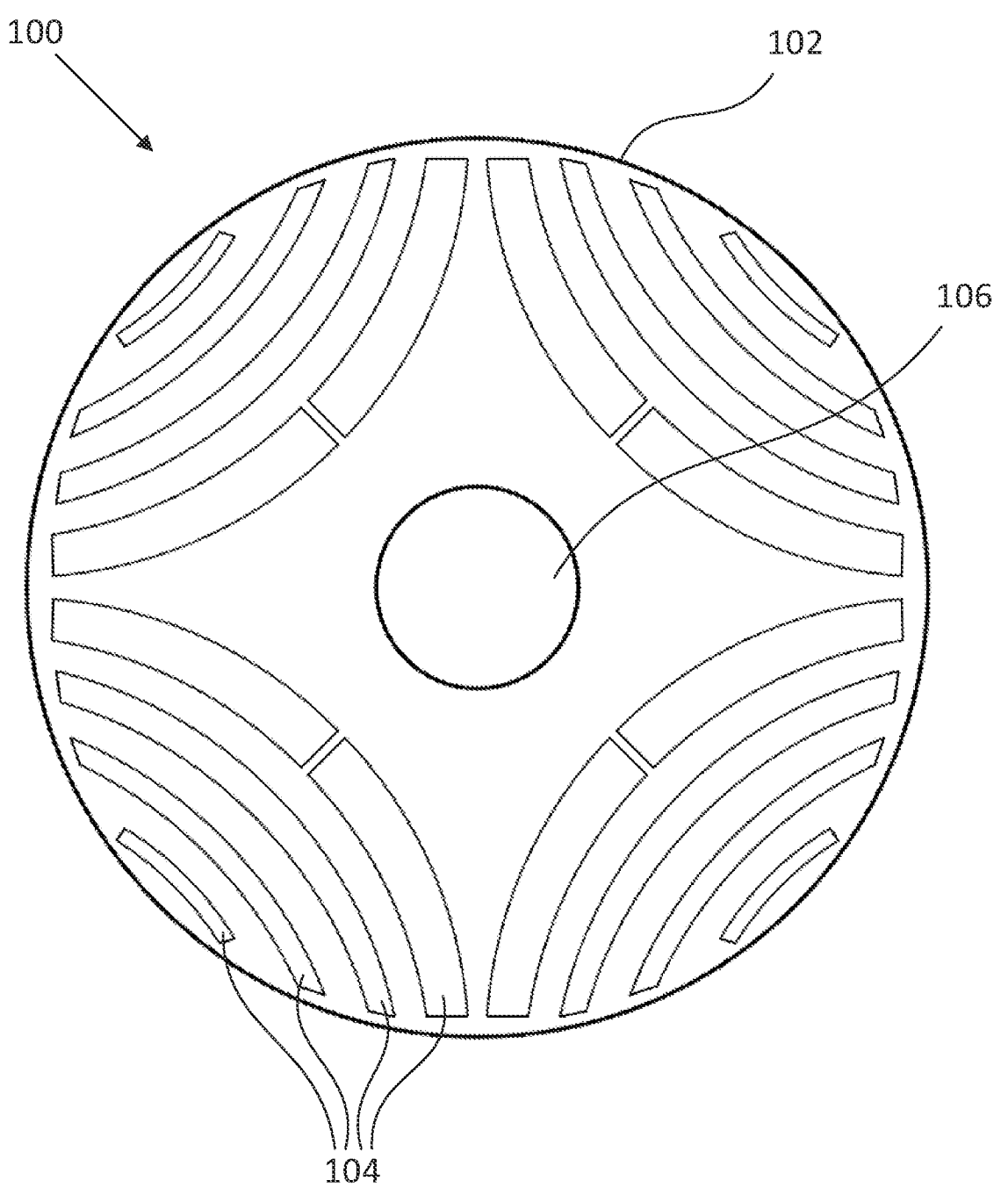
FIG. 1 illustrates a conventional reluctance rotor lamination.

FIG. 1 illustrates a reluctance rotor lamination 100 known in the prior art. The lamination 100 includes a lamination body 102 having a plurality of cavities 104 and a shaft opening 106. Reluctance rotors can be assembled by stacking a plurality of rotor laminations 100 of similar or identical shape on a shaft. A stacked collection of a plurality of rotor laminations 100 will thus form a rotor body having a cross-section similar to a rotor lamination 100 within the stack. The cavities 104 of the rotor laminations 100, when stacked, form cavities along the length of a rotor and are configured such that magnets may be arranged in the cavities.

In the specific embodiment illustrated in FIG. 1, the rotor lamination 100 has four poles, each pole being formed by cavities 104 which are concave in a radial direction away from the shaft opening 106. However, it will be readily understood that a variety of shapes, sizes, and configurations of the lamination 100 are possible depending on the specific use case of the reluctance motor in which the rotor lamination 100 is used. However, the difficulty and cost of manufacturing magnets that are to be inserted into cavities 104 increase as the shape complexity and the quantity of the cavities 104 increases. For example, while manufacturing a magnet for insertion into a smooth and curved cavity (such as those illustrated in FIG. 1) may not be particularly difficult or costly, more complex cavity shapes will require correspondingly complex magnet geometries configured to fit in the cavity. Regardless of the shape of the cavities 104, inserting magnets into cavities 104 formed by stacked rotor laminations 100 also requires careful control of the tolerances of both the magnets and the rotor laminations 100. Variations in the area of similar cavities 104 across a plurality of stacked rotor laminations, for example, will cause inconsistent cross-sectional area of cavities across the axial length of a rotor. Such variations may cause fitment issues when inserting pre-fabricated magnets. Furthermore, constraints in pre-fabrication of the magnets to be inserted in the cavities 104 may constrain the geometry of the cavities 104. Alignment of magnets for proper insertion into the cavities 104 may also become complicated depending on the shape and quantity of cavities 104 that must be filled.

Embodiments of the present invention address the foregoing limitations of conventional rotor laminations and their production by enabling an optimized magnetic material to be filled directly into the cavities of a rotor that comprises a plurality of rotor laminations 100. For illustrative purposes, injection molding is described as the manufacturing method in several embodiments according to the invention disclosed herein. Rather than pre-fabricating magnets, the magnetic material of the reluctance rotor can thus be formed after the rotor laminations 100 are stacked to form a rotor body. Furthermore, complex geometries that would otherwise cause difficulties when prefabricating magnets are more readily achieved, as the cavities of a rotor can be used as molds during the injection molding process.

Figure 2A:
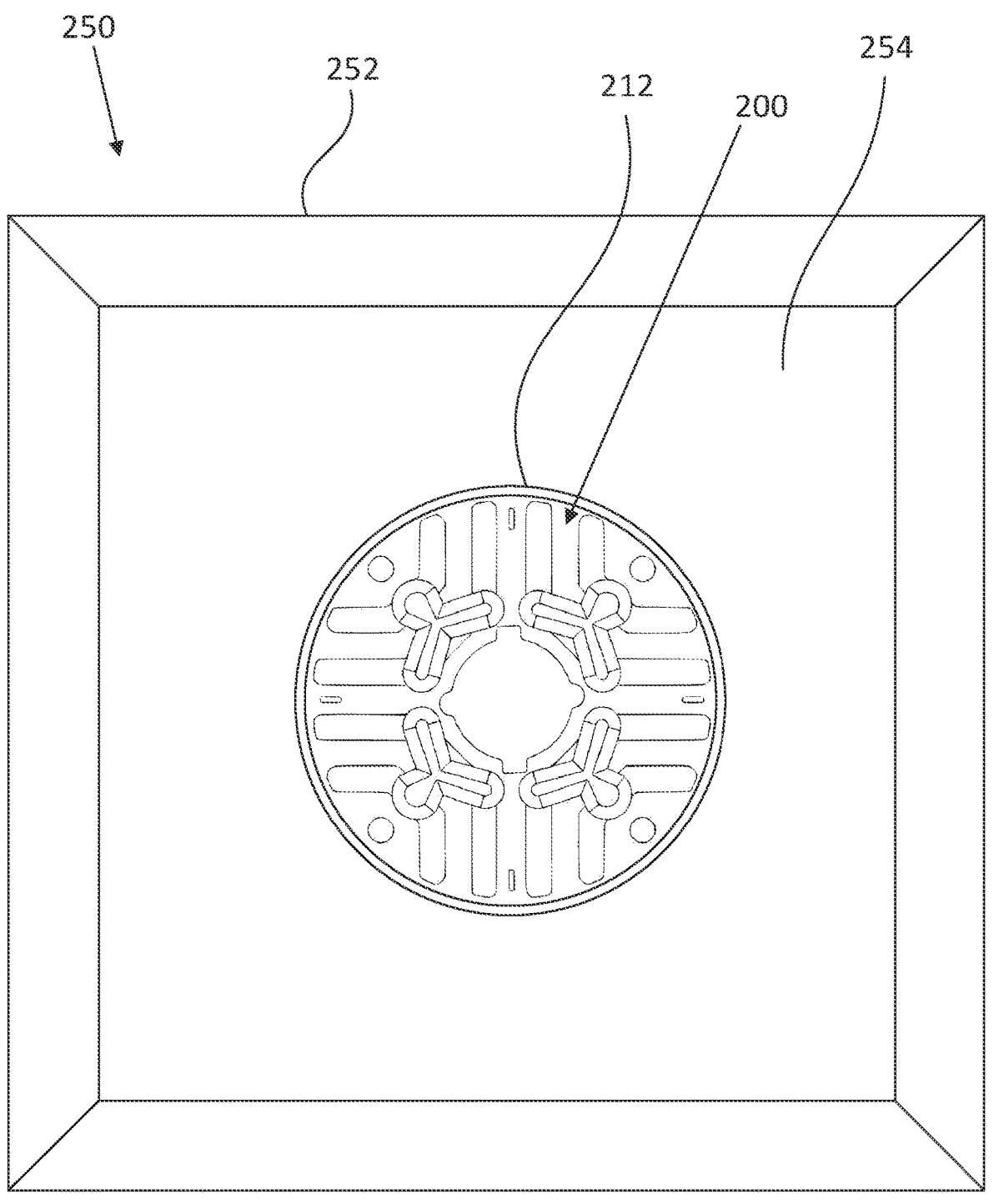
FIGS. 2A and 2B illustrate lamination with gates and a mold for injection molding a reluctance motor with polymer bonded magnetic material.

FIG. 2A illustrates a mold block 250 in which a rotor insert 200 may be inserted during an injection molding process. The mold block 250 includes an outer periphery 252 and an exterior surface 254. The retaining wall 212 is included in the exterior surface and provides a space for the rotor insert 200 to be inserted into the mold block 250. It will be readily appreciated that the mold block 250 may have a variety of shapes and sizes other than the specific shape and size illustrated in FIG. 2B. The shape and size of the mold block is dependent upon a particular molding process, manufacturing facilities, and/or the shape and size of the rotor insert 200. FIG. 2A also illustrates a gap 214 between an outer periphery of the rotor insert 200 and retaining wall 212.

Figure 2B:
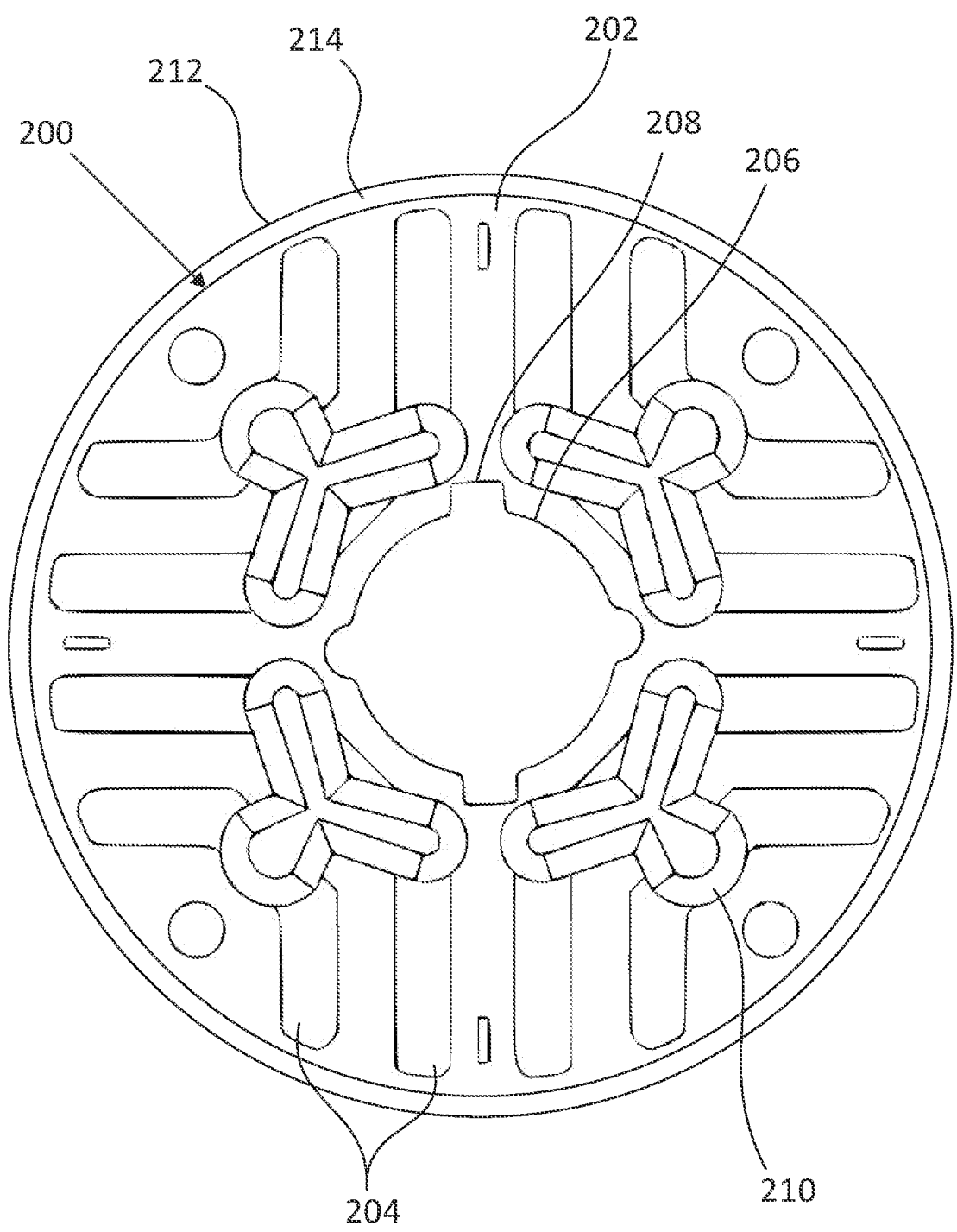

FIG. 2B illustrates a rotor insert 200 with gates 210 for injection molding a reluctance motor with polymer bonded magnetic material. The rotor insert 200 is made of a plurality of lamination bodies 202 stacked together with polymer-bonded magnet (PBM) filled in its cavities 204. The rotor insert 200 (and, accordingly, each of the lamination bodies 202 that make up the rotor insert 200) has a plurality of cavities 204 filled with composites and a shaft opening 206. A plurality of gates 210 are arranged above the cavities 204, are part of the composite fill, and reflect the manner in which a highly viscous plastic melt are directed into the cavities 204 under pressure. In the illustrated embodiment, the gates have a generally three-pronged shape, and each gate 210 is arranged at one of a plurality of poles of the rotor insert 200, although the particular shape, size and configuration of the gates can vary depending on cavity design. The illustrated three-pronged shape allows highly viscous plastic melt that is injected into the cavities 204 during injection molding to be distributed more evenly and for each cavity to be filled in the same period of time. It will be readily appreciated that other gate shapes and sizes may be realized without departing from the spirit of the present disclosure. For example, in an embodiment, each pole of the rotor insert 200 may include more than two cavities 204 that must be filled with a magnetic material. In such an embodiment, the gate may have to be larger to reach across a greater radial distance relative to the shaft opening 206 of the rotor insert 200. Furthermore, such an embodiment may require a gate shape with more prongs or a shape that does not include prongs, or the size of the prongs may change but accommodate extrusion of a plastic melt into all cavities 204 of a pole associated with the gate 210.

Figure 3:
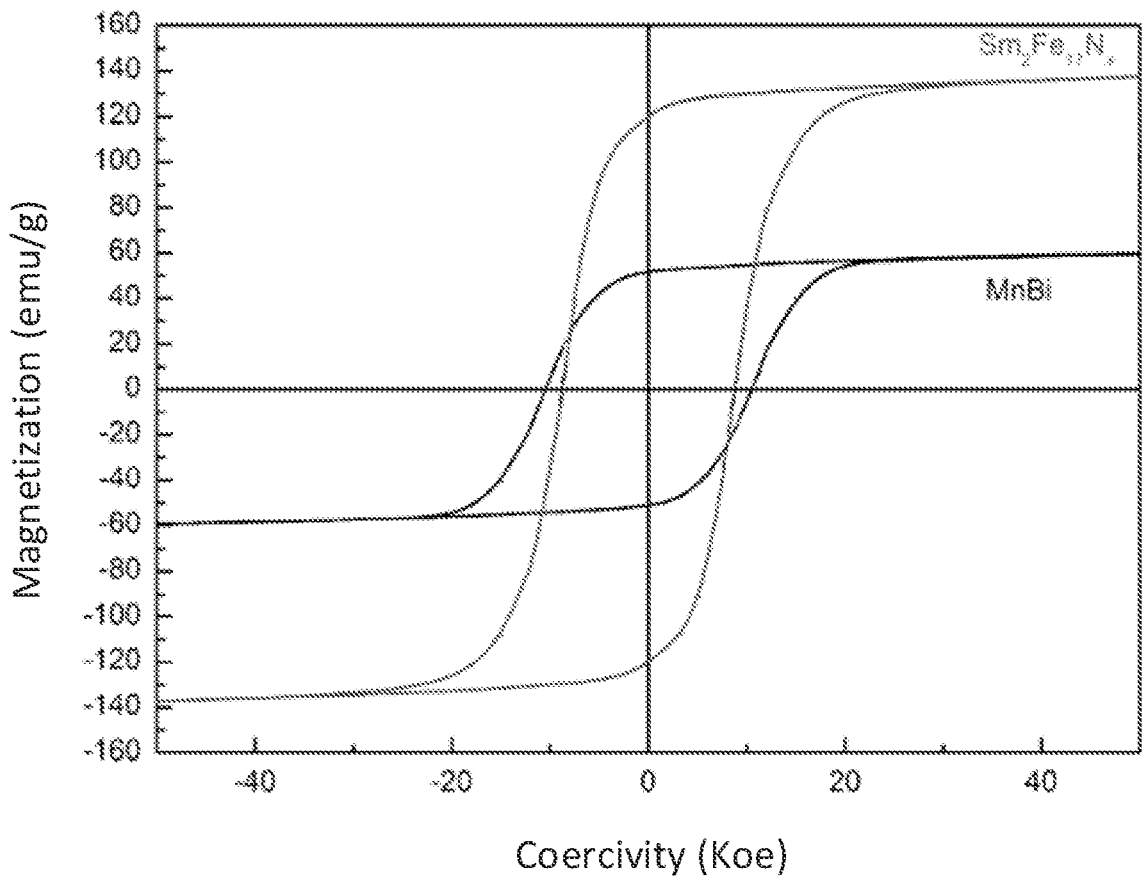
FIG. 3 illustrates magnetization versus applied field for magnetic compounds that can be mixed to form a compound according to an embodiment of the present disclosure.

Many hybrid materials include Sm—Fe—N. The driving force for combining Sm—Fe—N with other compounds is that Sm—Fe—N provides a higher saturation polarization and remanence than other compounds, such as Mn—Bi. A comparison of Sm—Fe—N and Mn—Bi is illustrated in FIG. 3. Specifically, FIG. 3 illustrates a magnetization versus external applied magnetic field graph for Sm—Fe—N and Mn—Bi. The y-axis represents magnetization of the materials in emu/g, although the units of the y-axis can also be determined in Teslas. The x-axis represents the external applied magnetic field, and the point at which the magnetization is zero is denominated coercivity, expressed in kOe or also in Teslas. Assuming the densities of Sm—Fe—N and Mn—Bi to be 7.0 g/cm$^3$ and 8.0 g/cm$^3$, respectively, remanences of injection bonded magnets for each material would be approximately 0.6-0.7 T and 0.3-0.4 T, respectively, for a filling factor of 65%.

Mn—Bi can be tuned to provide intrinsic coercivity that is not only similar to, but also higher than that of Sm—Fe—N. As a consequence, the distinct combination of Sm—Fe—N and Mn—Bi allows different degrees of cost-performance which can be tuned according to a particular application, since permanent magnet assisted synchronous reluctance machines (PMaSynRM) are less dependent on the magnetic flux provided by permanent magnets compared to other permanent magnet-based topologies. Mn—Bi is not commercially available at the time of the present disclosure. However, Mn—Bi is estimated to be an injection-moldable compound that may be obtained at relatively lower cost than other comparable compounds.

Although Mn—Bi has been used in a hybrid compound experimentally, previous uses and experiments with Mn—Bi have been based on a determination that Mn—Bi, when combined with other compounds, behaves as an exchanged-coupling. In contrast, however, embodiments of the present disclosure rely on a combination of Sm—Fe—N with Mn—Bi that behaves as a non-exchanged-coupling. That is, in contrast to other experimental uses of Mn—Bi, the combination of Sm—Fe—N with Mn—Bi in a polymer according to embodiments of the present disclosure behaves according to the rule of mixtures. As a result, a generally linear relationship can be used to represent the performance properties of a Sm—Fe—N and Mn—Bi hybrid according to an embodiment of the present disclosure. Furthermore, due to its behavior according to the rule of mixtures, volume fractions of each compound in the hybrid can be utilized to determine the properties of the hybrid as a whole. In some embodiments, the rule of mixtures can also be used to determine the proper proportion by volume of Mn—Bi that should be included in an Sm—Fe—N hybrid. For example, a predetermined performance property may be provided that corresponds to a needed performance property of a rotor or of an electric machine. The rule of mixtures can be used to determine the proportion of Mn—Bi by volume that should be included in the hybrid material to meet the needed performance property and/or predetermined performance property. Thus, embodiments of the present disclosure simplify a design and production process by making performance properties more predictable and readily determinable.

Past experimental uses of Mn—Bi also rely on the assumption that particle sizes of Mn—Bi are sufficiently small to facilitate exchange coupling. In order to facilitate exchange-coupling, a particle size of approximately 50-200 nanometers is required, but may vary depending on the particular material used in a hybrid. In injection molding, however, particle sizes on the order of microns (e.g., from 1 to 100 microns), not nanometers, are typical. Larger particles sizes are used for injection molding because pellets are first formed prior to an injection molding process, the pellets later being melted to form a polymer melt that is injected into a mold at pressure. Furthermore, larger particle sizes avoid agglomeration and are stable, as smaller particle sizes are prone to coalesce into larger particles and be more prone for oxidation. Thus, embodiments of the present disclosure utilize Mn—Bi at a particle size that is orders of magnitude larger than those demonstrated in exchanged-coupling hybrids.

In FIG. 3, the curves illustrating magnetization against external applied magnetic field are hysteresis loops. The particular properties of the curves illustrated depend on a variety of physical parameters. For example, a change in temperature may cause the hysteresis curves to be narrower. In hybrid materials known to include Mn—Bi with particles sizes sufficiently small enough to form an exchanged-coupling hybrid, physical parameter changes also cause deviations in the magnetization-external magnetic field curves that render the hybrid material to be less predictable. For example, a significant decrease in temperature may lead to an s-like curve for an exchanged-coupling hybrid that exhibits a so-called "kink" in the curve that disturbs the otherwise predictable transition from a maximum magnetization value in the first quadrant to a zero magnetization value in the second quadrant.

In contrast, some embodiments of the present disclosure do not form such "kinks" or deviations in hysteresis loops. In some embodiments, "kinks" or deviations are formed in hysteresis loops, but the similarity of curve shapes and the overlap of coercivity values prevents the "kinks" or deviations from being observed over a wider range of temperatures than conventional counterparts. While physical parameter changes may affect the particular properties of a curve, they do not form undesirable deviations in the curves, leading to more predictable and stable implementation in motor applications.

Embodiments of the present disclosure provide significant benefits in terms of performance for cost. In some embodiments, the disclosed Sm—Fe—N and Mn—Bi hybrid offers magnetization properties of other known hybrid magnetic materials while exhibiting strong resistance to demagnetization similar to known rare-earth-based materials. However, significant cost savings can be achieved because Mn—Bi is cheaper to produce than Sm—Fe—N. Further cost savings are achieved because Sm is a relatively cheap rare-earth material whose oxide costs about 3% of Nd oxide and constitutes about 23% of the mass of a hard magnetic phase and about 15% in bonded magnets. Furthermore, Sm can be procured more easily due to smaller demand for Sm than other rare-earth materials. Additionally, embodiments of the present disclosure provide diversification in supply chain management, allowing a magnetic material with sufficient performance to be produced without over-reliance on a single magnetic compound.

Embodiments of the present disclosure also provide intrinsic coercivity levels on the order of 1 Tesla, which is comparable to Nd—Fe—B molded counterparts. Embodiments of the present disclosure also provide flexibility in that, in order to compensate for lower power factor of higher pole number machines, higher magnet Br may be required, which may be allowed by different mixing ratio.

In some embodiments, a rotor injection molded with the disclosed Sm—Fe—N and Mn—Bi hybrid material is part of a synchronous reluctance motor. Embodiments of the present disclosure are advantageous in synchronous reluctance motors due to the complex geometry of rotor cavities into which magnetic material are typically inserted. As a result of being able to injection mold magnetic material into the rotor's cavities, improved rotor performance as well as manufacturing speed and precision improvements can be achieved.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of producing a rotor of a magnetic material comprising Samarium-Iron-Nitrogen (Sm—Fe—N), Manganese-Bismuth (Mn—Bi), and a polymer binder of an electric machine, comprising:

determining a target volume fraction of Mn—Bi of the magnetic material associated with desired performance characteristics of the magnetic material based on a predetermined linear relationship of volume fraction of the Mn—Bi with performance characteristics, the performance characteristics including coercivity or magnetization, wherein the predetermined linear relationship is based on Mn—Bi particle sizes being from 1 to 100 microns;

forming pellets that include a mixture of Sm—Fe—N particles, Mn—Bi particles, and polymer binder according to the desired volume fraction;

melting the pellets to form a polymer melt; and filling cavities of the rotor directly with the polymer melt to produce the magnetic material.

2. The method of claim 1, wherein the performance property is an application-specific performance requirement of a synchronous reluctance motor, and wherein the rotor is arranged in the synchronous reluctance motor.

3. The method of claim 1, wherein the cavities are filled with the polymer melt by injection molding and the polymer binder is a thermoplastic material.

4. The method of claim 1, wherein the cavities are filled with the polymer melt by compression molding, transfer molding, or potting, and wherein the polymer binder is a thermoset material.

5. The method of claim 1, wherein the magnetic material is a non-exchanged-coupling material.

6. The method of claim 1, wherein the performance characteristics further exhibit a hysteresis loop including two s-like curves with gradual curved transitions between each linear portion across an entire length of each respective s-like curve based on physical environmental parameters imposed on the magnetic material.

7. The method of claim 1, wherein the rotor is configured to rotate within a synchronous reluctance motor.

8. The method of claim 1, wherein the plurality of cavities are configured to be filled with the magnetic material by injection molding.

9. The method of claim 1, wherein the plurality of cavities are configured to be filled by compression molding, transfer molding, or potting.

\* \* \* \* \*